(12) United States Patent
Yang et al.

(10) Patent No.: US 11,934,029 B2
(45) Date of Patent: Mar. 19, 2024

(54) LENS ASSEMBLY

(71) Applicant: Samsung Electro-Mechanics Co., Ltd., Suwon-si (KR)

(72) Inventors: So Mi Yang, Suwon-si (KR); Jin Se Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 615 days.

(21) Appl. No.: 17/005,789

(22) Filed: Aug. 28, 2020

(65) Prior Publication Data

US 2021/0063675 A1 Mar. 4, 2021

(30) Foreign Application Priority Data

Aug. 30, 2019 (KR) .................. 10-2019-0107760

(51) Int. Cl.
*G02B 7/02* (2021.01)
*G02B 13/00* (2006.01)
*H04N 23/55* (2023.01)

(52) U.S. Cl.
CPC .......... *G02B 7/021* (2013.01); *G02B 13/001* (2013.01); *H04N 23/55* (2023.01)

(58) Field of Classification Search
CPC ..... G02B 13/001; G02B 7/021; H04N 5/2254
See application file for complete search history.

(56) References Cited

U.S. PATENT DOCUMENTS

| | | | | |
|---|---|---|---|---|
| 6,072,641 A * | 6/2000 | Miyamoto | ............. | G02B 7/021 |
| | | | | 359/819 |
| 8,670,659 B2 * | 3/2014 | Haruguchi | ............... | G03B 3/00 |
| | | | | 396/133 |
| 9,016,876 B2 | 4/2015 | Lai | | |
| 9,465,187 B2 * | 10/2016 | Calvet | .................... | G02B 7/022 |
| 2002/0005997 A1 | 1/2002 | Oba | | |
| 2002/0114085 A1 * | 8/2002 | Hattori | ............... | G11B 7/13922 |
| | | | | 359/811 |
| 2008/0138060 A1 * | 6/2008 | Chang | ..................... | G02B 7/08 |
| | | | | 396/529 |

(Continued)

FOREIGN PATENT DOCUMENTS

| | | |
|---|---|---|
| CN | 103852851 A | 6/2014 |
| CN | 105676401 A | 6/2016 |

(Continued)

OTHER PUBLICATIONS

Taiwanese Office Action dated Jan. 19, 2021, in counterpart Taiwanese Patent Application No. 109129703 (8 pages in English and 7 pages in Chinese).

(Continued)

*Primary Examiner* — Joseph P Martinez
*Assistant Examiner* — Vipin Patel
(74) *Attorney, Agent, or Firm* — NSIP Law

(57) ABSTRACT

A lens assembly includes a plurality of lenses spaced apart from each other along an optical axis; and a first spacer disposed along the optical axis between any two lenses of the plurality of lenses, wherein the first spacer includes a body portion including an opening enabling light to travel between the two lenses; and an extension portion protruding from one surface of the body portion and extending toward one lens of the two lenses, the one lens being either one of the two lenses, the one surface of the body portion is spaced apart from the one lens, and the extension portion contacts and supports the one lens.

22 Claims, 7 Drawing Sheets

(56) References Cited

U.S. PATENT DOCUMENTS

| | | | |
|---|---|---|---|
| 2009/0159200 A1 | 6/2009 | Rossi et al. | |
| 2010/0027137 A1* | 2/2010 | Noh | G02B 7/022 359/811 |
| 2014/0160581 A1 | 6/2014 | Cho et al. | |
| 2015/0219871 A1 | 8/2015 | Kim | |
| 2015/0323756 A1 | 11/2015 | Cho et al. | |
| 2016/0161702 A1 | 6/2016 | Yang | |
| 2019/0101718 A1* | 4/2019 | Masuzawa | B60R 25/305 |
| 2019/0154995 A1* | 5/2019 | Lin | G02B 9/04 |
| 2019/0179098 A1 | 6/2019 | Yang et al. | |
| 2019/0179103 A1 | 6/2019 | Yang et al. | |
| 2019/0238730 A1 | 8/2019 | Wan | |

FOREIGN PATENT DOCUMENTS

| | | |
|---|---|---|
| CN | 114296205 A | 4/2022 |
| JP | 2019-133139 A | 8/2019 |
| KR | 10-2014-0136726 A | 12/2014 |
| KR | 10-2015-0092458 A | 8/2015 |
| KR | 10-2019-0070230 A | 6/2019 |
| KR | 10-2019-0070231 A | 6/2019 |
| TW | 200935525 A | 8/2009 |
| TW | M479421 U | 6/2014 |

OTHER PUBLICATIONS

Chinese Office Action dated Apr. 25, 2022, in counterpart Chinese Patent Application No. 202010893927.8 (10 pages in English and 11 pages in Chinese).

Korean Office Action dated Aug. 8, 2022, in counterpart Korean Patent Application No. 10-2020-0109662 (12 pages in English, 8 pages in Korean).

Korean Office Action dated Oct. 4, 2023, in counterpart Korean Patent Application No. 10-2023-0052569 (11 pages in English, 7 pages in Korean).

* cited by examiner

A

LENS ASSEMBLY

CROSS-REFERENCE TO RELATED APPLICATIONS

This application claims the benefit under 35 USC 119(a) of Korean Patent Application No. 10-2019-0107760 filed on Aug. 30, 2019, in the Korean Intellectual Property Office, the entire disclosure of which is incorporated herein by reference for all purposes.

BACKGROUND

1. Field

This application relates to a lens assembly.

2. Description of Related Art

For some time now, a camera module is commonly provided in portable electronic devices such as smartphones.

The camera module is provided with a lens assembly including a plurality of lenses, and a spacer that maintains a predetermined spacing between lenses is disposed between the lenses.

As the camera module and the lens assembly have been miniaturized, a sensitivity to variations in the spacing between lenses has increased, and thus the ability to obtain a precise spacing is needed.

When manufacturing and assembling a lens assembly including a spacer disposed between lenses, manufacturing errors and/or assembly tolerances may occur, making it difficult to obtain a precise spacing between the lenses.

In addition, when some of the lenses are inadvertently assembled in a tilted state, optical axes of the tilted lenses do not line up with an optical axis of the lens assembly, which causes a deterioration in a quality of captured images, so the tilt of the lenses needs to be prevented.

Further, in order to miniaturize the lens assembly, it is necessary to reduce the size of the spacer, but when the size of the spacer is reduced, a durability and a reliability of the spacer are decreased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens assembly includes a plurality of lenses spaced apart from each other along an optical axis; and a first spacer disposed along the optical axis between any two lenses of the plurality of lenses, wherein the first spacer may include a body portion including an opening enabling light to travel between the two lenses; and an extension portion protruding from one surface of the body portion and extending toward one lens of the two lenses, the one lens being either one of the two lenses, the one surface of the body portion is spaced apart from the one lens, and the extension portion contacts and supports the one lens.

The extension portion may include at least three protrusions protruding from the one surface, extending toward the one lens, and spaced apart from each other, and each of the at least three protrusions may contact and support the one lens.

The extension portion may include a plurality of protrusions protruding from the one surface, extending toward the one lens, and spaced apart from each other, a width of each of the plurality of protrusions in a direction perpendicular to the optical axis decreases as the protrusions extend toward the one lens, and an angle "a" between a side surface of each of the plurality of protrusions and a line parallel to the optical axis may satisfy the conditional expression $0.5° \leq a \leq 60°$.

The body portion may include an inner circumferential surface surrounding the opening; and an outer circumferential surface surrounding the body portion, and the extension portion may be spaced apart from the inner circumferential surface and the outer circumferential surface.

The one lens may include an optical portion exhibiting a lens characteristic of the first lens; and a flange portion not exhibiting the lens characteristic of the first lens and extending from an edge of at least a portion of the optical portion in a direction away from the optical axis, the optical portion may include a first edge and a second edge disposed on opposite sides of the optical axis in a first direction; and a third edge and a fourth edge disposed on opposite sides of the optical axis in a second direction perpendicular to the first direction, the third edge may connect a first end of the first edge to a first end of the second edge, the fourth edge may connect a second end of the first edge to a second end of the second edge, and a shortest distance between the first edge and the second edge may be greater than a shortest distance between the third edge and the fourth edge.

The flange portion may include a first flange portion extending from the first edge of the optical portion; and a second flange portion extending from the second edge of the optical portion, and the extension portion may contact and support the first flange portion and the second flange portion.

The body portion may include an inner circumferential surface surrounding the opening; and an outer circumferential surface surrounding the body portion, and the inner circumferential surface and the outer circumferential surface may have different shapes.

The inner circumferential surface may have a circular shape when viewed in a direction of the optical axis, and the outer circumferential surface may have a non-circular shape when viewed in the direction of the optical axis.

The outer circumferential surface may include a first outer surface and a second outer surface disposed on opposite sides of the optical axis in the first direction; and a third outer surface and a fourth outer surface disposed on opposite sides of the optical axis in the second direction, the third outer surface may connect a first end of the first outer surface to a first end of the second outer surface, the fourth outer surface may connect a second end of the first outer surface to a second end of the second outer surface, and a shortest distance between the first outer surface and the second outer surface may be greater than a shortest distance between the third outer surface and the fourth outer surface.

A distance between the first outer surface and the inner circumferential surface, and between the second outer surface and the inner circumferential surface, may be greater than a distance between the third outer surface and the inner circumferential surface, and between the fourth outer surface and the inner circumferential surface.

The extension portion may be disposed between the first outer surface and the inner circumferential surface, and between the second outer surface and the inner circumferential surface.

The conditional expression $0.05 \text{ mm} \leq w \leq 3 \text{ mm}$ may be satisfied, where w is the distance between the third outer surface and the inner circumferential surface, and between the fourth outer surface and the inner circumferential surface.

The conditional expression $0.00333<h2/h1<0.667$ may be satisfied, where h1 is a height of the first spacer including the body portion and the extension portion in a direction of the optical axis, and h2 is a height of the extension portion in the direction of the optical axis.

The conditional expressions $0.1\ mm \leq h1 \leq 3\ mm$ and $0.01\ mm \leq h2 \leq 2\ mm$ may be satisfied:

The lens assembly may further include a second spacer disposed between the one lens and the first spacer.

A height of the second spacer in a direction of the optical axis may be smaller than a height of the first spacer in the direction of the optical axis.

The first spacer and the second spacer may be made of different materials.

A portable electronic device may include a camera module including the lens assembly of the one general aspect described above.

In another general aspect, a lens assembly includes a first lens; a second lens spaced apart from the first lens along an optical axis; and a spacer disposed between along the optical axis the first lens and the second lens, wherein each of the first lens, the second lens, and the spacer has a non-circular shape when viewed in a direction of the optical axis, a first axis intersecting the optical axis and perpendicular to the optical axis, and a second axis intersecting the optical axis and perpendicular to the optical axis and the first axis, a length of the first axis being greater than a length of the second axis, the spacer may include a body portion including an opening enabling light to travel between the first lens and the second lens; and a first extension portion protruding from one surface of the body portion and extending toward the first lens, the one surface of the body portion is spaced apart from the first lens, and the first extension portion contacts and supports the first lens.

The conditional expression $0.00333<h2/h1<0.667$ may be satisfied, where h1 is a height of the spacer including the body portion and the first extension portion in a direction of the optical axis, and h2 is a height of the first extension portion in the direction of the optical axis.

The spacer may further include a second extension portion protruding from another surface of the body portion and extending toward the second lens, the other surface being on an opposite side of the body portion from the one surface, the other surface of the body portion may be spaced apart from the second lens, and the second extension portion may contact and support the second lens.

A portable electronic device may include a camera module including the lens assembly of the other general aspect described above.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
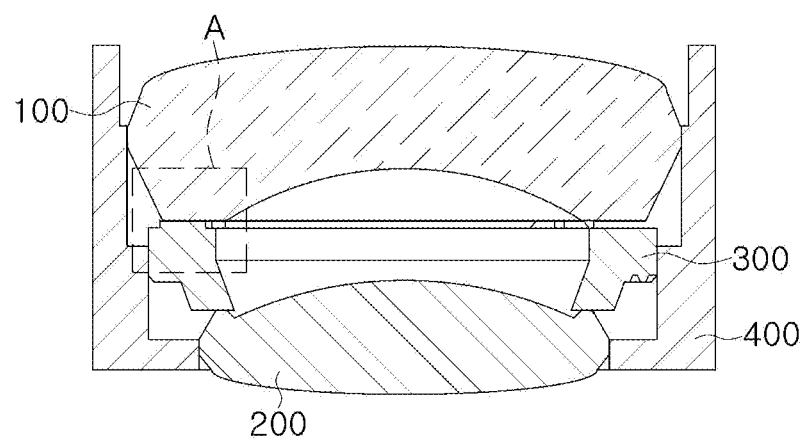
FIG. 1 is a schematic cross-sectional view of an example of a lens assembly.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first", "second", and "third" may be used herein to describe various elements, these elements are not to be limited by these terms. Rather, these terms are only used to distinguish one element from another element. Thus, a first element referred to in examples described herein may also be referred to as a second element without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
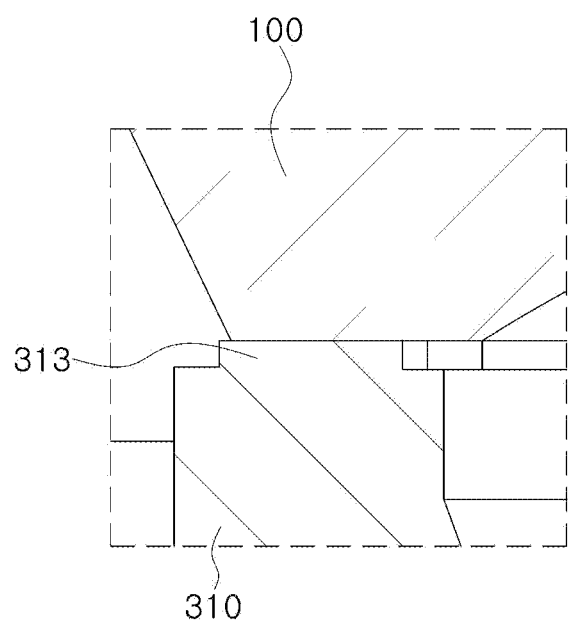
FIG. 2 is an enlarged view of part A of FIG. 1.
Figure 3:
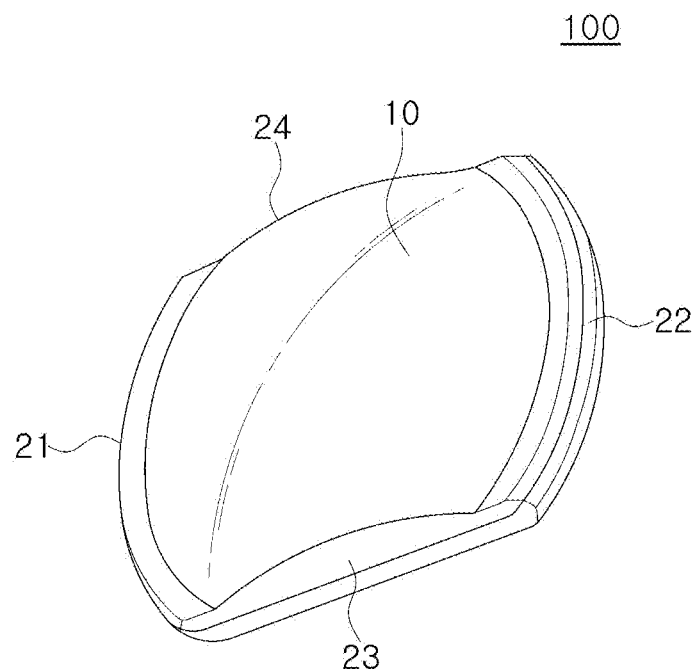
FIG. 3 is a schematic perspective view of an example of a lens.
Figure 4:
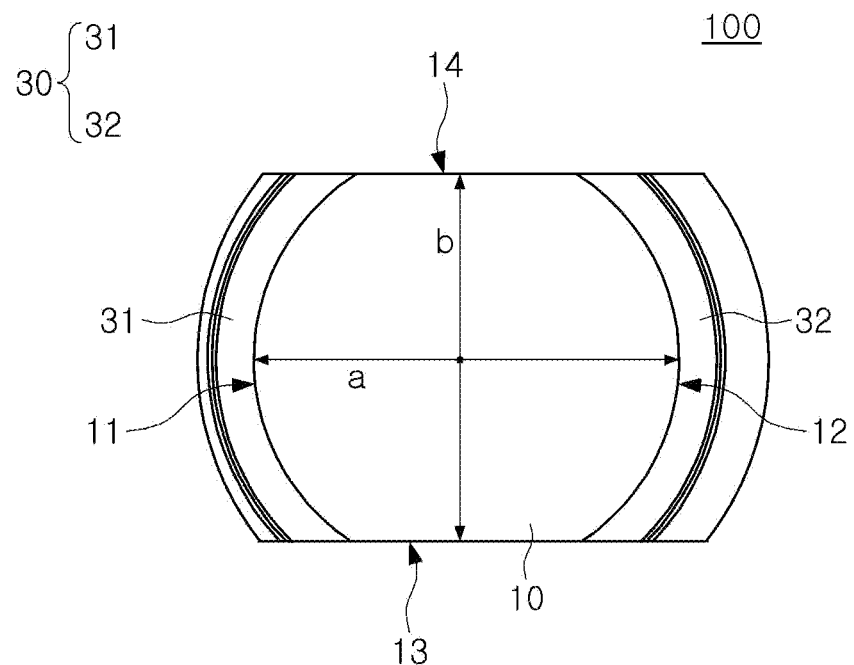
FIG. 4 is a schematic plan view of an example of a lens.

FIG. 1 is a schematic cross-sectional view of an example of a lens assembly, FIG. 2 is an enlarged view of part A of FIG. 1, FIG. 3 is a schematic perspective view of an example of a lens, and FIG. 4 is a schematic plan view of an example of a lens.

Referring to FIG. 1, a lens assembly 1 includes a first lens 100, a second lens 200, a spacer 300, and a lens barrel 400. Although FIG. 1 shows that the lens assembly 1 includes only two lenses, i.e., the first lens 100 and the second lens 200, this is merely an example, and this disclosure is not limited to any particular number of lenses. That is, the lens assembly 1 may further include other lenses in addition to the first lens 100 and the second lens 200.

The first lens 100 and the second lens 200 are spaced apart from each other by a predetermined distance in an optical axis direction.

If the lens assembly 1 further includes other lenses, all of the lenses including the first lens 100, the second lens 200, and the other lenses are spaced apart from each other by predetermined distances in the optical axis direction.

The spacer 300 is disposed between the first lens 100 and the second lens 200.

The spacer 300 maintains the predetermined distance between the first lens 100 and the second lens 200, and blocks unnecessary light. For example, the spacer 300 may be provided with a light absorbing layer to block the unnecessary light. The light absorbing layer may be a black film or a black iron oxide.

The spacer 300 may be made of plastic or metal.

The first lens, the second lens 200, and the spacer 300 are disposed inside the lens barrel 400. The first lens 100 and the second lens 200 are spaced apart from each other by the predetermined distance in the optical axis direction inside the lens barrel 400, and the spacer 300 is disposed between the first lens 100 and the second lens 200. The lens barrel 400 may have a hollow cylindrical shape.

If the lens assembly 1 further includes other lenses, all of the lenses including the first lens 100, the second lens 200, and the other lenses as well as the spacer 300 are disposed in the lens barrel 400, and all of the lenses are spaced apart from each other by predetermined distances in the optical axis direction inside the lens barrel 400.

The first lens 100 and the second lens 200 have a non-circular shape when viewed in the optical axis direction.

If the lens assembly 1 further includes other lenses, the first lens 100 and the second lens 200 may have a non-circular shape when viewed in the optical axis direction, and the other lenses may have a circular shape when viewed in the optical axis direction. Alternatively, the other lenses may also have a non-circular shape when viewed in the optical axis direction.

A statement that a plastic injection-molded lens has a non-circular shape means that a portion of the plastic-injection molded lens other than a gate of the plastic injection-molded lens has a non-circular shape. In other words, if the only portion of a plastic injection-molded lens that has a non-circular shape is the gate of the plastic injection-molded lens, then the plastic-injection molded lens does not have a non-circular shape as defined in this application.

The first lens 100 and the second lens 200 having the non-circular shape have four side surfaces, and two of the four side surfaces face each other and have the same shape.

Referring to FIG. 3, when the first lens 100 is viewed in the optical axis direction, a first side surface 21 and a second side surface 22 of the first lens 100 have an arc shape, and a third side surface 23 and a fourth side surface 24 of the first lens 100 have a substantially straight shape. Although not shown in the drawings, a gate, which is a passage through which a resin material is injected into a mold to form the first lens 100, may be formed on either the first side surface 21 or the second side surface 22.

The third side surface 23 and the fourth side surface 24 connect the first side surface 21 and the second side surface 22 to each other. In addition, the third side surface 23 and the fourth side surface 24 are symmetrical about the optical axis, and are parallel to each other.

The first lens 100 and the second lens 200 may have a non-circular shape when viewed in the optical axis direction. Hereinafter, only the first lens 100 will be described for convenience of description.

Referring to FIGS. 3 and 4, the first lens 100 includes an optical portion 10 and a flange portion 30.

The optical portion 10 is a portion of the first lens 100 in which the first lens 100 exhibits a lens characteristic of the first lens 100. For example, light reflected from a subject may be refracted while passing through the optical portion 10.

The optical portion 10 may have a refractive power and may have an aspherical surface.

The flange portion 30 is a portion for attaching the first lens 100 to another element, for example, to the lens barrel 400 or the spacer 300. The first lens 100 does not exhibit the lens characteristic of the first lens 100 in the flange portion 30.

The flange portion 30 extends from a periphery of at least a portion of the optical portion 10 and may be integrally formed with the optical portion 10.

The optical portion 10 and the flange portion 30 have a non-circular shape. For example, the optical portion 10 and the flange portion 30 have a non-circular shape when viewed in the optical axis direction. Alternatively, the optical portion 10 may have a circular shape when viewed in the optical axis direction, and the flange portion 30 may have a non-circular shape when viewed in the optical axis direction.

The optical portion 10 includes a first edge 11, a second edge 12, a third edge 13, and a fourth edge 14, and the first edge 11 and the second edge 12 are positioned to face each other, and the third edge 13 and the fourth edge 14 are positioned to face each other.

The third edge 13 and the fourth edge 14 connect the first edge 11 and the second edge 12 to each other.

When viewed in the optical axis direction, the first edge 11 and the second edge 12 have an arc shape, and the third edge 13 and the fourth edge 14 have a substantially straight shape. The third edge 13 and the fourth edge 14 are symmetrical about the optical axis, and are parallel to each other.

The optical portion 10 has a major axis (a) and a minor axis (b). For example, when the optical portion is viewed in the optical axis direction, a shortest line segment connecting the third edge 13 and the fourth edge 14 to each other while passing through the optical axis is a minor axis (b), and a line segment connecting the first edge 11 and the second edge 12 to each other while passing through the optical axis and being perpendicular to the minor axis (b) is a major axis (a).

The length of the major axis (a) of the optical portion 10 is longer than the length of the minor axis (b) of the optical portion 10.

The flange portion 30 includes a first flange portion 31 and a second flange portion 32. The first flange portion 31 extends away from the first edge 11 of the optical portion 10, and the second flange portion 32 extends away from the second edge 12 of the optical portion 10.

The first edge 11 of the optical portion 10 is adjacent to the first flange portion 31, and the second edge 12 of the optical portion 10 is adjacent to the second flange portion 32.

The third edge 13 of the optical portion 10 is not adjacent to any portion of the flange portion 30, and the fourth edge 14 of the optical portion 10 is not adjacent to any portion of the flange portion 30.

The first lens 100 is made of a plastic material, and is formed in an injection molding operation. The third edge 13 and the fourth edge 14 of the first lens 100 are not formed by cutting off a portion of the lens after the injection molding operation, but are formed to have the substantially straight shape in the injection molding operation.

When a portion of a lens is cut off after the lens is formed in an injection molding operation, the lens may be deformed by a cutting force applied to the lens, and accordingly the optical performance of the lens may change.

However, since the first lens 100 is formed to have the non-circular shape during the injection molding operation, the optical performance of the first lens 100 may be ensured while the size of the first lens 100 may be reduced.

Figure 5:
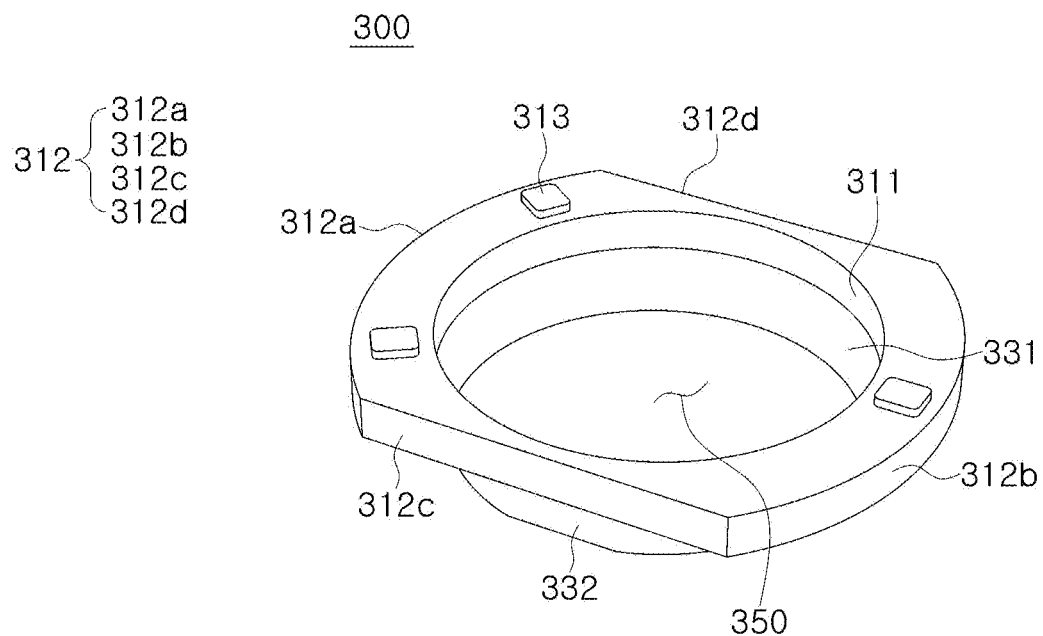
FIGS. 5 and 6 are schematic perspective views illustrating examples of a spacer.
Figure 6:
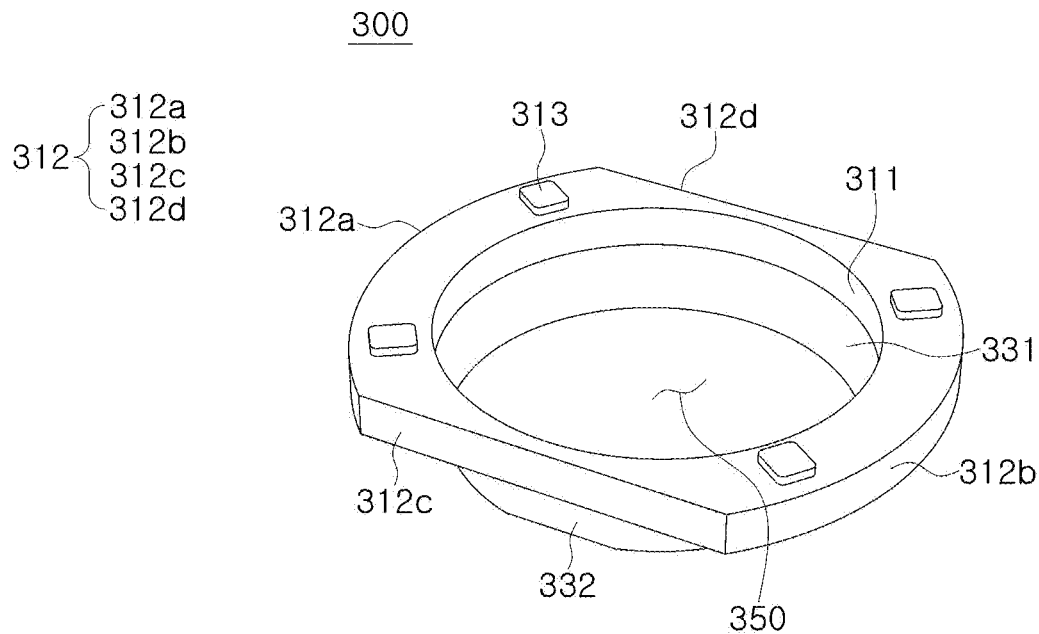
Figure 7:
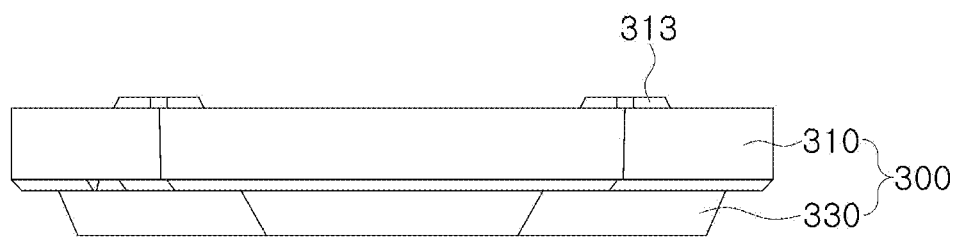
FIGS. 7 and 8 are schematic side surface views illustrating examples of a spacer.
Figure 8:
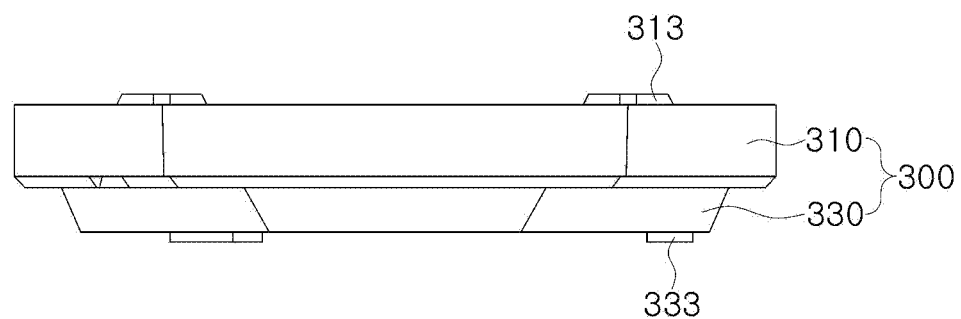

FIGS. 5 and 6 are schematic perspective views illustrating examples of a spacer, and FIGS. 7 and 8 are schematic side surface views illustrating examples of a spacer.

A spacer 300 is disposed between the first lens 100 and the second lens 200.

The spacer 300 includes a first body portion 310 and a second body portion 330 connected to each other. The first body portion 310 faces the first lens 100, and the second body portion 330 faces the second lens 200.

The spacer 300 has an opening 350 through which light passes. The opening 350 is formed by an inner circumferential surface 311 of the first body portion 310 and an inner circumferential surface 331 of the second body portion 330. That is, a space surrounded by the inner circumferential surface 311 of the first body portion 310 and the inner circumferential surface 331 of the second body portion 330 is the opening 350.

The inner circumferential surface 311 of the first body portion 310 and the inner circumferential surface 331 of the second body portion 330 are circular when viewed in the optical axis direction. However, an outer circumferential surface 312 of the first body portion 310 and an outer circumferential surface 332 of the second body portion 330 are non-circular when viewed in the optical axis direction. Thus, the shapes of the inner circumferential surfaces 311 and 331 are different from the shapes of the outer circumferential surfaces 312 and 332.

The shape of the outer circumferential surface 312 of the first body portion 310 may correspond to the shape of the first lens 100. For example, the outer circumferential surface 312 of the first body portion 310 includes a first outer side surface 312*a* corresponding to the first side surface 21 of the first lens 100, a second outer side surface 312*b* corresponding to the second side surface 22 of the first lens 100, a third outer side surface 312*c* corresponding to the third side surface 23 of the first lens 100, and a fourth outer side surface 312*d* corresponding to the fourth side surface 24 of the first lens 100.

The first outer side surface 312*a* and the second outer side surface 312*b* face each other and have opposite shapes, and the third outer side surface 312*c* and the fourth outer side surface 312*d* face each other and have the same shape.

When viewed in the optical axis direction, the first outer side surface 312*a* and the second outer side surface 312*b* have an arc shape, and the third outer side surface 312*c* and the fourth outer side surface 312*d* have a substantially straight shape.

The third outer side surface 312*c* and the fourth outer side surface 312*d* connect the first outer side surface 312*a* and the second outer side surface 312*b* to each other.

In addition, the third outer side surface 312*c* and the fourth outer side surface 312*d* are symmetrical about the optical axis, and are parallel to each other.

The second body portion 330 may have generally the same shape as the first body portion 310 except that an outer diameter of the second body portion 330 is smaller than an outer diameter of the first body portion 310. That is, the shape of the outer circumferential surface 332 of the second body portion 330 may correspond to the shape of the outer circumferential surface 312 of the first body portion 310.

An entire surface of the spacer 300 facing the first lens 100 is not in contact with the first lens 100, but only a portion thereof is in contact with the first lens 100.

To this end, an extension portion 313 is formed on the first body portion 310. For example, the extension portion 313 protrudes from one surface of the first body portion 310 and extends toward the first lens 100.

The extension portion 313 includes a plurality of protrusions spaced apart from each other. For example, the extension portion 313 includes at least three protrusions.

The first body portion 310 is spaced apart from the first lens 100 by a predetermined distance, and the extension portion 313 is configured to contact and support the first lens 100.

Specifically, the extension portion 313 contacts and supports the flange portion 30 of the first lens 100. When the extension portion 313 includes three protrusions, one protrusion contacts and supports the first flange portion 31, and the other two protrusions contact and support the second flange portion 32. Alternatively, two protrusions contact and support the first flange portion 31, and the other protrusion contacts and supports the second flange portion 32.

When the extension portion 313 includes four protrusions, two protrusions contact and support the first flange portion 31, and the other two protrusions contact and support the second flange portion 32.

The extension portion 313 protrudes from one surface of the first body portion 310 and is spaced apart from the inner circumferential surface 311 and the outer circumferential surface 312 of the first body portion 310.

Due to manufacturing errors and/or assembly tolerances that occur in a process of manufacturing and assembling the spacer 300, it may be difficult to obtain a precise predetermined distance between the first lens 100 and the second lens 200.

The greater a contact surface between the spacer 300 and the first lens 100, the greater an influence of the manufacturing errors and/or assembly tolerances on the distance between the first lens 100 and the second lens 200.

However, since the spacer 300 contacts the first lens 100 only through the extension portion 313, only the surface of the extension portion 313 that contacts the first lens 100 needs to be made flat and perpendicular to the optical axis to enable a precise distance to be obtained between the first lens 100 and the second 200, and to prevent the first lens 100 from being assembled in a tilted state.

Furthermore, since only a portion of the spacer 300 contacts and supports the first lens 100, a height of a remaining portion of the spacer 300 in the optical axis direction may be reduced.

Accordingly, the lens assembly 1 enables a precise distance to be obtained between the first lens 100 and the second lens 200 while reducing an overall size of the spacer 300.

Furthermore, as illustrated in FIG. 8, an extension portion 333 may also be provided on one surface of the second body portion 330.

That is, an entire surface of the spacer 300 facing the second lens 200 is not in contact with the second lens 200, but only a portion thereof is in contact with the second lens 200.

To this end, an extension portion 333 is formed on the second body portion 330. For example, the extension portion 333 protrudes from one surface of the second body portion 330 and extends toward the second lens 200.

The extension portion 333 includes a plurality of protrusions spaced apart from each other. As an example, the extension portion 333 includes at least three protrusions.

The second body portion 330 is spaced apart from the second lens 200 by a predetermined distance, and the extension portion 333 is configured to contact and support the second lens 200.

Figure 9:
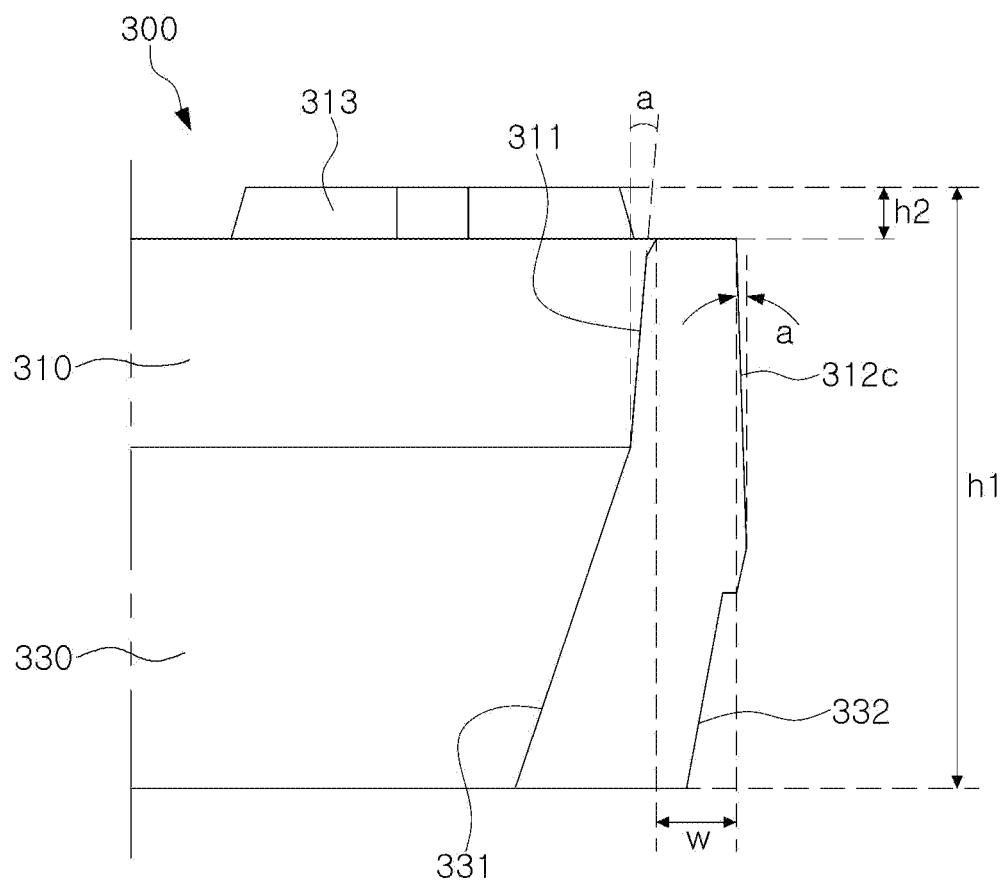
FIG. 9 is a side view illustrating a portion of an example of a spacer.

FIG. 9 is a side surface view illustrating a portion of an example of a spacer.

Referring to FIG. 9, the spacer 300 is formed so that at least a portion of the outer circumferential surface 312 of the first body portion 310 and at least a portion of the inner circumferential surface 311 of the first body portion 310 are inclined relative to each other.

For example, the third outer side surface 312c of the outer circumferential surface 312 and the inner circumferential surface 311 are inclined in opposite directions relative to each other so that they become closer to each other as they approach the surface of the first body portion 310 on which the extension portion 313 is formed.

If each of an inclination angle of the outer circumferential surface 312 with respect to a line parallel to the optical axis and an inclination angle of the inner circumferential surface 311 with respect to a line parallel to the optical axis is "a," "a" may satisfy the following Conditional Expression 1.

$0.5° \leq a \leq 60°$ (Conditional Expression 1)

A width of each protrusion of the extension portion 313 may decrease as the protrusion extends away from the surface of the first body portion 310. For example, a side surface of the protrusion may be inclined with respect to a line parallel to the optical axis.

An inclination angle of the side surface of the protrusion of the extension portion 313 with respect to the line parallel to the optical axis may also satisfy Conditional Expression 1.

The spacer 300 has a height h1 in the optical axis direction and the extension 313 has a height h2 in the optical axis direction.

The height h1 of the spacer 300 is a height including the height h2 of the extension portion 313 protruding from the surface of the first body portion 310.

A ratio h2/h1 of the height h2 of the extension portion 313 to the height h1 of the spacer 300 may satisfy the following Conditional Expression 2.

$0.00333 < h2/h1 < 0.667$ (Conditional Expression 2)

Furthermore, the height h1 of the spacer 300 in mm may satisfy the following Conditional Expression 3, and the height h2 of the extension portion 313 in mm may satisfy the following Conditional Expression 4.

$0.1 \text{ mm} \leq h1 \leq 3 \text{ mm}$ (Conditional Expression 3)

$0.01 \text{ mm} \leq h2 \leq 2 \text{ mm}$ (Conditional Expression 4)

In the spacer 300, a distance between the outer circumferential surface 312 and the inner circumferential surface 311 (hereinafter referred to as a width w of the spacer 300) may change along a circumferential direction of the inner circumferential surface 311.

For example, the spacer 300 has a maximum width wmax and a minimum width wmin.

The maximum width wmax is a width between the first outer side surface 312a or the second side outer surface 312b and the inner circumferential surface 311, and the minimum width wmin is a width between the third outer side surface 312c or the fourth outer side surface 312d and the inner circumferential surface 311.

The minimum width wmin of the spacer 300 in mm may satisfy the following Conditional Expression 5.

$0.05 \text{ mm} \leq w \leq 3 \text{ mm}$ (Conditional Expression 5)

Figure 10:
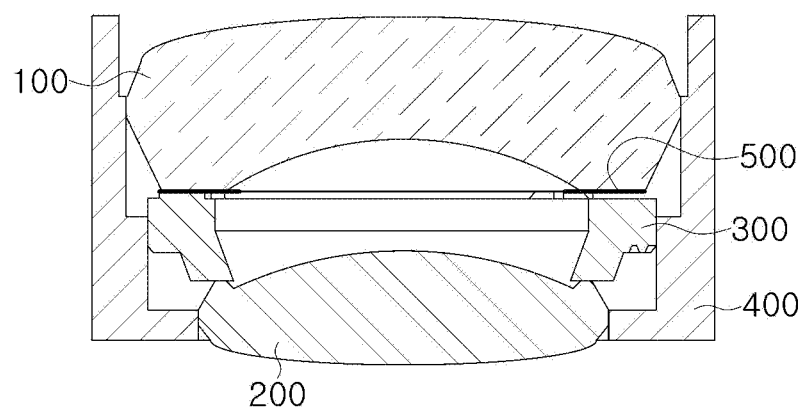
FIG. 10 is a schematic cross-sectional view of another example of a lens assembly.

FIG. 10 is a schematic cross-sectional view of another example of a lens assembly.

Referring to FIG. 10, a lens assembly 2 is the same as the lens assembly 1 of FIG. 1, except that a second spacer 500 is further disposed between the first lens 100 and a first spacer 300.

The first spacer 300 is the same as the spacer 300 described above with reference to FIGS. 1 to 9.

Referring to FIG. 10, the second spacer 500 is disposed between the first lens 100 and the first spacer 300.

Therefore, the first spacer 300 indirectly supports the first lens 100 through the second spacer 500.

A height of the second spacer 500 in the optical axis direction is smaller than a height of the first spacer 300 in the optical axis direction.

The first spacer 300 and the second spacer 500 are made of different materials. For example, the first spacer 300 is made of a plastic or metal material, and the second spacer 500 is made of a film material (e.g., a polyethylene terephthalate (PET) film).

Figure 11:
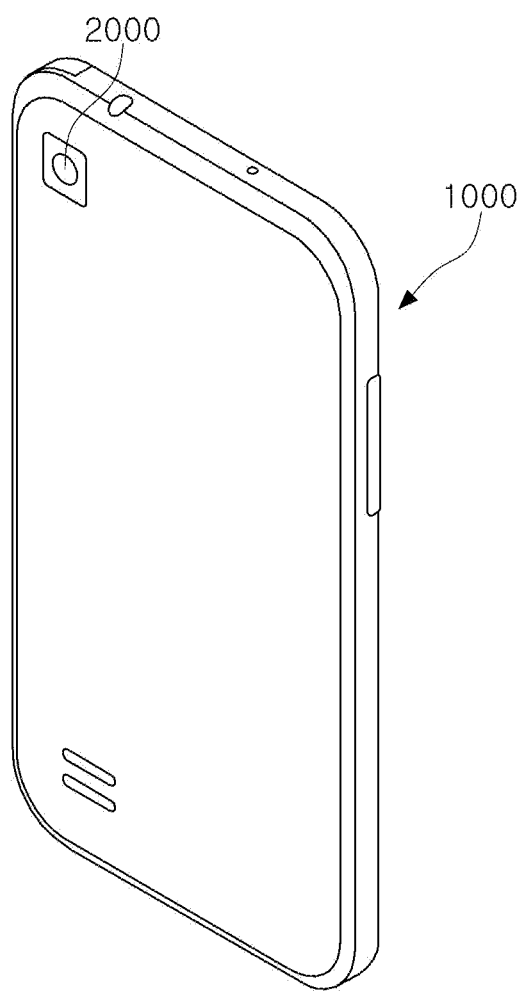
FIG. 11 is a schematic plan view of an example of a portable electronic device.

FIG. 11 is a schematic plan view of an example of a portable electronic device equipped with a camera module.

Referring to FIG. 11, a portable electronic device 1000 is equipped with a camera module 2000 on a rear surface of the portable electronic device 1000. The portable electronic device 1000 may be any portable electronic device equipped with a camera module, such as a mobile communication terminal, a smartphone, or a tablet PC.

Although FIG. 11 shows that the portable electronic device 1000 is equipped with one camera module 2000, this is just an example, and the portable electronic device 1000 may be equipped with two, three, four, or more camera modules. The camera modules may have different imaging characteristics, such as different focal lengths, different angles of view, and different numbers of pixels.

Although FIG. 11 shows the camera module 2000 on the rear surface of the portable electronic device 1000, this is merely an example, and the portable electronic device 1000 may also be equipped with a camera module on a front surface of the portable electronic device.

The camera module 2000 includes a lens assembly, which may be the lens assembly 1 or the lens assembly 2 described above.

In the examples described above, a lens assembly is able to accurately maintain a distance between lenses, thereby improving durability and reliability of the lens assembly.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens assembly comprising:
a plurality of lenses spaced apart from each other along an optical axis; and
a first spacer disposed along the optical axis between any two lenses of the plurality of lenses,
wherein the first spacer comprises:
a body portion comprising an opening enabling light to travel between the two lenses; and
an extension portion protruding from one surface of the body portion and extending toward one lens of the two lenses, the one lens being either one of the two lenses,
the one surface of the body portion is spaced apart from the one lens,
the extension portion contacts and supports the one lens, and is discontinuous in a circumferential direction of the first spacer around the optical axis,
the body portion further comprises:
an inner circumferential surface surrounding the opening; and
an outer circumferential surface surrounding the body portion, and
at least a portion of the inner circumferential surface and at least a portion of the outer circumferential surface are inclined in opposite directions relative to each other so that they approach each other as they approach the one surface of the body portion.

2. The lens assembly of claim 1, wherein the extension portion comprises at least three protrusions protruding from the one surface, extending toward the one lens, and spaced apart from each other, and
each of the at least three protrusions contacts and supports the one lens.

3. The lens assembly of claim 1, wherein the extension portion comprises a plurality of protrusions protruding from the one surface, extending toward the one lens, and spaced apart from each other,
a width of each of the plurality of protrusions in a direction perpendicular to the optical axis decreases as the protrusions extend toward the one lens, and
an angle "a" between a side surface of each of the plurality of protrusions and a line parallel to the optical axis satisfies the following conditional expression:

$$0.5° \leq a \leq 60°.$$

4. The lens assembly of claim 1, wherein the extension portion is spaced apart from the inner circumferential surface and the outer circumferential surface.

5. The lens assembly of claim 1, wherein the one lens comprises:
an optical portion exhibiting a lens characteristic of the first lens; and
a flange portion not exhibiting the lens characteristic of the first lens and extending from an edge of at least a portion of the optical portion in a direction away from the optical axis,
the optical portion comprises:
a first edge and a second edge disposed on opposite sides of the optical axis in a first direction; and
a third edge and a fourth edge disposed on opposite sides of the optical axis in a second direction perpendicular to the first direction,
the third edge connects a first end of the first edge to a first end of the second edge,
the fourth edge connects a second end of the first edge to a second end of the second edge, and
a shortest distance between the first edge and the second edge is greater than a shortest distance between the third edge and the fourth edge.

6. The lens assembly of claim 5, wherein the flange portion comprises:
a first flange portion extending from the first edge of the optical portion; and
a second flange portion extending from the second edge of the optical portion, and
the extension portion contacts and supports the first flange portion and the second flange portion.

7. The lens assembly of claim 1, wherein the inner circumferential surface and the outer circumferential surface have different shapes when viewed in a direction of the optical axis.

8. The lens assembly of claim 7, wherein the outer circumferential surface comprises:
a first outer surface and a second outer surface disposed on opposite sides of the optical axis in the first direction; and
a third outer surface and a fourth outer surface disposed on opposite sides of the optical axis in the second direction,
the third outer surface connects a first end of the first outer surface to a first end of the second outer surface,
the fourth outer surface connects a second end of the first outer surface to a second end of the second outer surface, and
a shortest distance between the first outer surface and the second outer surface is greater than a shortest distance between the third outer surface and the fourth outer surface.

9. The lens assembly of claim 8, wherein a distance between the first outer surface and the inner circumferential surface, and between the second outer surface and the inner circumferential surface, is greater than a distance between the third outer surface and the inner circumferential surface, and between the fourth outer surface and the inner circumferential surface.

10. The lens assembly of claim 9, wherein the extension portion is disposed between the first outer surface and the inner circumferential surface, and between the second outer surface and the inner circumferential surface.

11. The lens assembly of claim 9, wherein the following conditional expression is satisfied:

$$0.05 \text{ mm} \le w \le 3 \text{ mm}$$

where w is the distance between the third outer surface and the inner circumferential surface, and between the fourth outer surface and the inner circumferential surface.

12. The lens assembly of claim 1, further comprising a second spacer disposed between the one lens and the first spacer and contacting the one lens and the first spacer.

13. The lens assembly of claim 12, wherein a height of the second spacer in a direction of the optical axis is smaller than a height of the first spacer in the direction of the optical axis.

14. The lens assembly of claim 12, wherein the first spacer and the second spacer are made of different materials.

15. A portable electronic device comprising a camera module comprising the lens assembly of claim 1.

16. A lens assembly comprising:
a plurality of lenses spaced apart from each other along an optical axis; and
a first spacer disposed along the optical axis between any two lenses of the plurality of lenses,
wherein the first spacer comprises:
a body portion comprising an opening enabling light to travel between the two lenses; and
an extension portion protruding from one surface of the body portion and extending toward one lens of the two lenses, the one lens being either one of the two lenses,
the one surface of the body portion is spaced apart from the one lens,
the extension portion contacts and supports the one lens,
the body portion further comprises:
an inner circumferential surface surrounding the opening; and
an outer circumferential surface surrounding the body portion,
the inner circumferential surface and the outer circumferential surface have different shapes when viewed in a direction of the optical axis,
the inner circumferential surface has a circular shape when viewed in the direction of the optical axis,
the outer circumferential surface has a non-circular shape when viewed in the direction of the optical axis, and
at least a portion of the inner circumferential surface and at least a portion of the outer circumferential surface are inclined in opposite directions relative to each other so that they approach each other as they approach the one surface of the body portion.

17. A lens assembly comprising:
a plurality of lenses spaced apart from each other along an optical axis; and
a first spacer disposed along the optical axis between any two lenses of the plurality of lenses,
wherein the first spacer comprises:
a body portion comprising an opening enabling light to travel between the two lenses; and
an extension portion protruding from one surface of the body portion and extending toward one lens of the two lenses, the one lens being either one of the two lenses,
the one surface of the body portion is spaced apart from the one lens,
the extension portion contacts and supports the one lens, and is discontinuous in a circumferential direction of the first spacer around the optical axis, and
the following conditional expression is satisfied:

$$0.00333 < h2/h1 < 0.667$$

where h1 is a height of the first spacer including the body portion and the extension portion in a direction of the optical axis, and h2 is a height of the extension portion in the direction of the optical axis.

18. The lens assembly of claim 17, wherein the following conditional expressions are satisfied:

$$0.1 \text{ mm} \le h1 \le 3 \text{ mm, and}$$

$$0.01 \text{ mm} \le h2 \le 2 \text{ mm.}$$

19. A lens assembly comprising:
a first lens;
a second lens spaced apart from the first lens along an optical axis; and
a spacer disposed between along the optical axis the first lens and the second lens,
wherein each of the first lens, the second lens, and the spacer has a non-circular shape when viewed in a direction of the optical axis, a first axis intersecting the optical axis and perpendicular to the optical axis, and a second axis intersecting the optical axis and perpendicular to the optical axis and the first axis, a length of the first axis being greater than a length of the second axis,
the spacer comprises:
a body portion comprising an opening enabling light to travel between the first lens and the second lens; and
a first extension portion protruding from one surface of the body portion and extending toward the first lens,
the one surface of the body portion is spaced apart from the first lens,
the first extension portion contacts and supports the first lens, and is discontinuous in a circumferential direction of the spacer around the optical axis, the body portion further comprises:
- an inner circumferential surface surrounding the opening; and
- an outer circumferential surface surrounding the body portion, and at least a portion of the inner circumferential surface and at least a portion of the outer circumferential surface are inclined in opposite directions relative to each other so that they approach each other as they approach the one surface of the body portion.

20. The lens assembly of claim 19, wherein the following conditional expression is satisfied:

$$0.00333 < h2/h1 < 0.667$$

where h1 is a height of the spacer including the body portion and the first extension portion in a direction of the optical axis, and h2 is a height of the first extension portion in the direction of the optical axis.

21. The lens assembly of claim 19, wherein the spacer further comprises a second extension portion protruding from another surface of the body portion and extending toward the second lens, the other surface being on an opposite side of the body portion from the one surface, the other surface of the body portion is spaced apart from the second lens, and the second extension portion contacts and supports the second lens.

22. A portable electronic device comprising a camera module comprising the lens assembly of claim 19.

* * * * *